(12) United States Patent
Ding et al.

(10) Patent No.: US 7,706,925 B2
(45) Date of Patent: Apr. 27, 2010

(54) INTEGRATED PRESSURE AND FLOW RATIO CONTROL SYSTEM

(75) Inventors: Junhua Ding, Tewksbury, MA (US);
Michael L'Bassi, Sterling, MA (US);
Kaveh H. Zarkar, Andover, MA (US);
William R. Clark, Hampstead, NH (US)

(73) Assignee: MKS Instruments, Inc., Wilmington, MA (US)

( * ) Notice: Subject to any disclaimer, the term of this patent is extended or adjusted under 35 U.S.C. 154(b) by 134 days.

(21) Appl. No.: 11/651,908

(22) Filed: Jan. 10, 2007

(65) Prior Publication Data

US 2008/0167748 A1 Jul. 10, 2008

(51) Int. Cl.
*G05D 7/00* (2006.01)
*G05D 9/00* (2006.01)
*G01F 7/00* (2006.01)

(52) U.S. Cl. .................. 700/282; 700/281; 702/45; 702/46; 702/47; 702/48; 702/49

(58) Field of Classification Search ................ 700/282, 700/121, 281, 289
See application file for complete search history.

(56) References Cited

U.S. PATENT DOCUMENTS 5,500,256 A 3/1996 Watabe 6,333,272 B1 12/2001 McMillin et al.
2005/0082002 A1 4/2005 Sato et al.
2005/0199342 A1 9/2005 Shajii et al.

FOREIGN PATENT DOCUMENTS

WO WO 02095519 A1 * 11/2002

OTHER PUBLICATIONS

International Search Report for Corresponding PCT Application No. PCT/US07/083309.
Written Opinion for for Corresponding PCT Application No. PCT/US07/083309.

* cited by examiner

*Primary Examiner*—Ramesh B Patel
*Assistant Examiner*—Sivalingam Sivanesan
(74) *Attorney, Agent, or Firm*—McDermott Will & Emery LLP

(57) ABSTRACT

An integrated pressure and flow ratio control system includes N mass flow controllers $MFC_i$ (i=1, ..., N) that each control the flow rate of a fluid $F_i$ (i=1, ..., N) flowing into a processing chamber. These N mass flow controllers are linked together by a digital communication network. One of the mass flow controllers is a master MFC, and the remaining N−1 MFCs are slave MFCs. The master MFC receives a pressure set point and a plurality N of flow ratio set points from a host controller, and communicates these set points to all the slave MFCs. In this way, the pressure in the chamber is maintained at the pressure set point and the flow ratios $Q_i/Q_T$ are maintained at the flow ratio set points, where $Q_i$ is flow rate of the i-th fluid $F_i$, and $Q_T = Q_1 + Q_2 + \ldots Q_N$ is the sum of all N flow rates.

22 Claims, 3 Drawing Sheets

INTEGRATED PRESSURE AND FLOW RATIO CONTROL SYSTEM

BACKGROUND

In processes such as semiconductor fabrication, precise amounts of gases or other fluids have to be delivered to a processing chamber or other facility. In some applications, a plurality of process gases or fluids may have to be delivered and processed.

In these applications, the flow ratios between the flow rates of the individual fluids and the total flow rate summed over all the fluids have to be maintained at desired set point values. Typically, this may accomplished by using multiple mass flow controllers to control the individual flow rates of each of the fluids. A related variable that needs to be controlled and maintained at a desired set point value is the pressure in the processing chamber. Controlling the flow rates and concentrations of multiple fluid lines, while at the same time maintaining the chamber pressure at a desired value, may be a challenge.

There is a need for systems and methods for controlling in a reliable and efficient manner both the pressure in a processing chamber as well as the flow ratios of multiple fluids that flow into the chamber for processing.

SUMMARY

A pressure and flow ratio control system includes a plurality N of mass flow controllers $MFC_i$ (i=1, ..., N). These N mass flow controllers are linked together by a digital communication network. Each mass flow controller is configured to receive at an inlet an i-th one of a plurality N of fluids $F_i$ (i=1, ..., N), and to control flow rate of the i-th fluid $F_i$ from the inlet through an outlet of the $MFC_i$ and onto a processing chamber configured to process the fluids $F_i$ (i=1, ..., N).

The mass flow controllers $MFC_i$ (i=1, ..., N) include one master MFC and N−1 slave MFCs. The master MFC is configured to receive a pressure set point and a plurality N of flow ratio set points from a host controller. The master MFC is further configured to communicate the pressure set point and the flow ratio set points to all the slave MFCs, together with one or more command signals, so as to maintain pressure in the chamber at the pressure set point and so as to maintain ratios $Q_i/Q_T$ (i=1, ..., N) at the flow ratio set points, where $Q_i$ represents flow rate of the i-th fluid $F_i$, and $Q_T$ represents a sum $Q_T = Q_1 + ... + Q_i + ... Q_N$ of flow rates of all N individual fluids $F_i$ (i=1, ..., N).

DETAILED DESCRIPTION

An integrated pressure and flow ratio control system is disclosed that allows both chamber pressure as well as flow ratios of multiple fluids to be controlled in a cost effective and flexible manner, as the fluids are delivered to and processed in the chamber. The system includes a plurality of mass flow controllers (MFCs) that are linked through a digital communication network. One of the MFCs is a master MFC that communicates with a host controller and transmit commands from the host controller to the remaining MFCs, which are slave or client MFCs.

Figure 1:
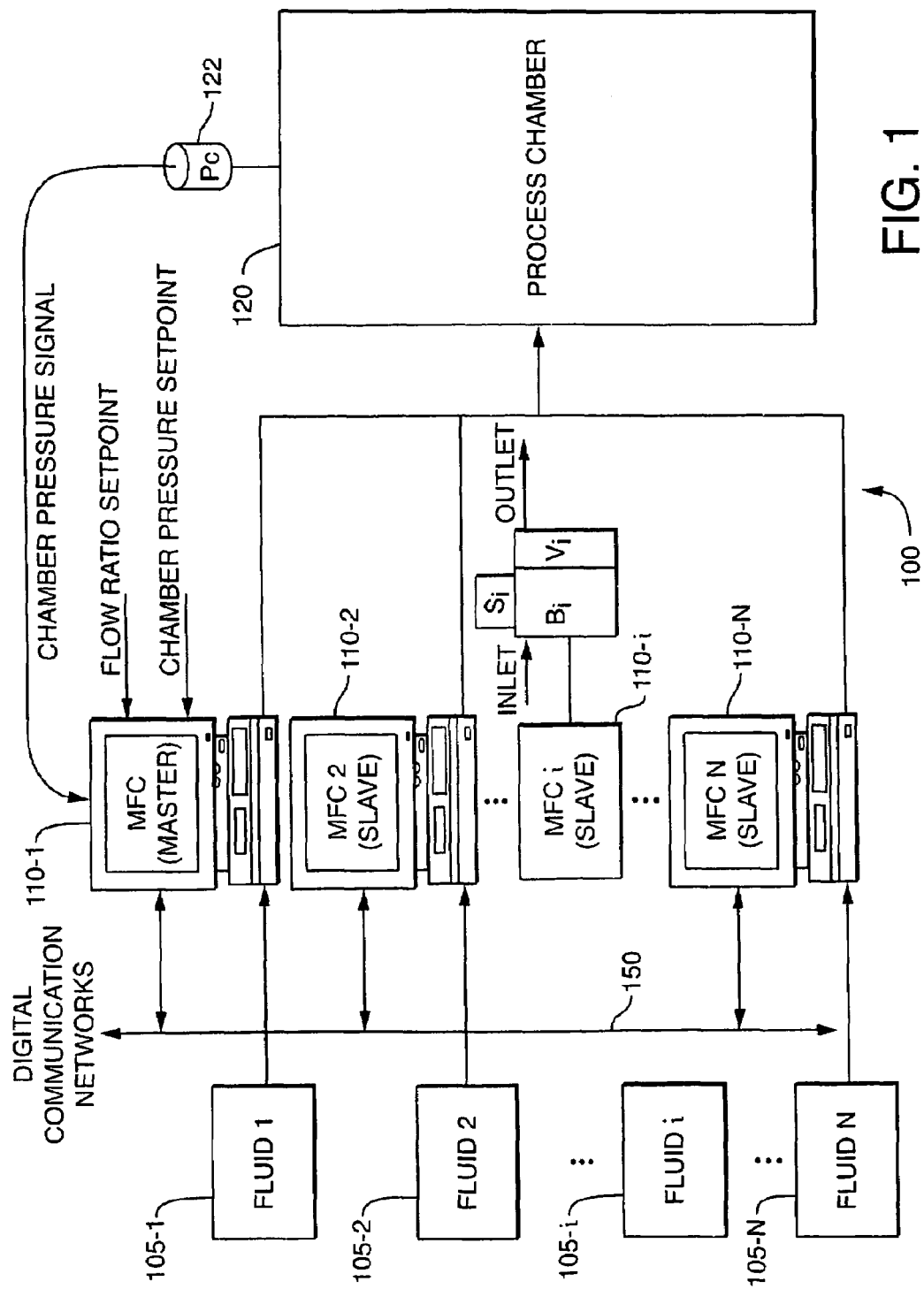
FIG. 1 schematically illustrates an integrated pressure and flow ratio control system in accordance with one embodiment of the present disclosure.

FIG. 1 schematically illustrates an integrated pressure and flow ratio control system 100 in accordance with one embodiment of the present disclosure. In overview, the system 100 includes a plurality N of mass flow controllers $MFC_i$ (i=1, ..., N) that are linked to each other by the digital communication network. The mass flow controllers $MFC_i$ are illustrated in FIG. 1 as $MFC_1$, $MFC_2$, ..., $MFC_i$, ..., $MFC_N$, and are indicated using reference numerals 110-1, 110-2, ..., 110-i, ..., 110-N. The i-th mass flow controller $MFC_i$ (110-i) is configured to receive a corresponding i-th fluid $F_i$ (i=1, ..., N) at an inlet of the $MFC_i$. In other words, $MFC_1$ receives fluid $F_1$, $MFC_2$ receives fluid $F_2$, ... and $MFC_N$ receives fluid $F_N$. The system 100 also includes a pressure transducer 122 that is configured to measure the pressure of the processing chamber 120 and provide this pressure information to one of the mass flow controllers by either an analog signal or a digital signal.

The $MFC_i$ then measures and controls the flow rate of the fluid $F_i$, as the fluid $F_i$ flows from the inlet to an outlet of the $MFC_i$, then onto a processing chamber 120. The processing chamber 120 is configured to process multiple fluids $F_i$ (i=1, ..., N). Some of the fluids $F_i$ may be gases, for example processing gases used for semiconductor processing. Others may be fluids other than gas, e.g. liquids. At least some of the fluids $F_i$ (i=1, ..., N) may be different from each other. For example, the fluids $F_i$ may include a number of different process gases and/or one or more purge gases. The mass flow controllers $MFC_i$ (i=1, ..., N) may receive the individual fluids $F_i$ from fluid suppliers such as gas tanks, illustrated in FIG. 1 using reference numerals 105-1, 105-2, ..., 105-i, ..., 105-N.

One of the mass flow controllers $MFC_i$ (i=1, ..., N) is selected to be a master MFC, while the remaining (N−1) MFCs are slave or client MFCs. In the exemplary embodiment illustrated in FIG. 1, $MFC_1$ (110-1) is selected to be the master MFC, while $MFC_2$, ..., $MFC_N$ (110-2, ..., 110-N) are selected to be the slave or client MFCs, although any other one of the N mass flow controllers can be selected to be the master MFC, in other embodiments of the present disclosure.

The master MFC 110-1 and the slave MFCs 110-2 ... 110-N are linked to each other and to a host controller (not shown in FIG. 1; shown in FIG. 2) through a digital communications network. The network may include, but is not limited to, one or more of the following: Ethernet TCP/IP (Transmission Control Protocol/Internet Protocol); UDP/IP (User Datagram Protocol/Internet Protocol); DeviceNet; CAN (Controller Area Network); RS (Recommended Standard)-232; and RS (Recommended Standard)-485. A digital communication bus 150, shown in FIG. 1, enables communications between the master MFC 110-1 and the slave MFCs 110-2 ... 110-N. The communication between the master MFC 110-1 and the host controller can be either on the same digital communication network or a separate digital communication network. In an embodiment in which the pressure signal from the pressure transducer 122 is a digital signal, the pressure transducer 122 may also be on the same digital communication network as the other MFCs.

Each mass flow controller $MFC_i$ (i=1, ..., N) connected to the digital communication network is a self-closed flow control system. Typically, each individual $MFC_i$ may include a flow body $B_i$ (i=1, ..., N) that has an inlet and an outlet and that is configured to receive the corresponding fluid $F_i$ at the inlet. The flow body $B_i$ may provide a flow path for the fluid $F_i$, between the inlet and the outlet. Each mass flow controller $MFC_i$ may further include a flow sensor $S_i$ (i=1, ..., N) that measures the flow rate of the fluid $F_i$ as the fluid $F_i$ flows from an inlet to an outlet of the $MFC_i$, and a control valve $V_i$ (i=1, ..., N) that regulates the flow of the fluid $F_i$ at a desired flow rate.

Linking mass flow controllers to a digital communication network in the manner described above permits a flexible method of configuring an unknown number of flow channels as an integrated pressure and mass flow ratio control system. In this way, the system may easily adapt to situations in which the number N of fluids $F_i$, and corresponding flow channels for the fluids $F_i$, may be variable, i.e. different for different applications.

The principal role of the master MFC 110-1 is to communicate with the host controller, and to transmit the commands received from the host controller to the slave MFCs. In particular, the master MFC 110-1 receives flow ratio set points from the host controller and communicates the flow ratio set points, together with one or more command signals, to all the slave MFCs. Only the master MFC, and not any of the slave MFCs, communicates with the host controller. The master MFC and each one of the slave MFCs respond to the flow ratio set points sent by the host controller by controlling the flow rate of the respective fluid flowing therethrough in such a way that the ratios $Q_i/Q_T$ (i=1, ..., N) satisfy the ratio set points, where $Q_i$ represents the flow rate of the i-th fluid $F_i$ and $Q_T$ represents the sum $Q_T=Q_1+ \ldots +Q_i+ \ldots Q_N$ of the flow rates of all N individual fluids $F_i$ (i=1, ..., N). In this way, the ratios $Q_i/Q_T$ (i=1, ..., N) can be maintained at the flow ratio set points sent by the host controller.

One of the N mass flow controllers $MFC_i$ (i=1, ..., N) is a pressure control MFC, which receives a pressure set point from the host controller and controls pressure in the chamber 120 so as to maintain the pressure in the chamber at the pressure set point. In the illustrated embodiment, the pressure control MFC and the master MFC are the same, namely $MFC_1$ (110-1). The system 100 operates most efficiently when the pressure control MFC and the master MFC are the same, as illustrated in FIG. 1. The pressure control MFC need not necessarily be the master MFC, however, and in other embodiments (not shown), MFCs other than the master MFC may be the pressure control MFC.

The pressure transducer 122 measures the actual pressure within the processing chamber 120. The pressure control MFC includes a pressure input at which it receives a chamber pressure signal from the pressure transducer 122. The chamber pressure signal indicates the chamber pressure measured by the pressure transducer 122. The pressure control MFC regulates the flow to the processing chamber 120 in order to control the pressure in the chamber, in response to the pressure signal, until the pressure in the chamber reaches the pressure set point.

Figure 2:
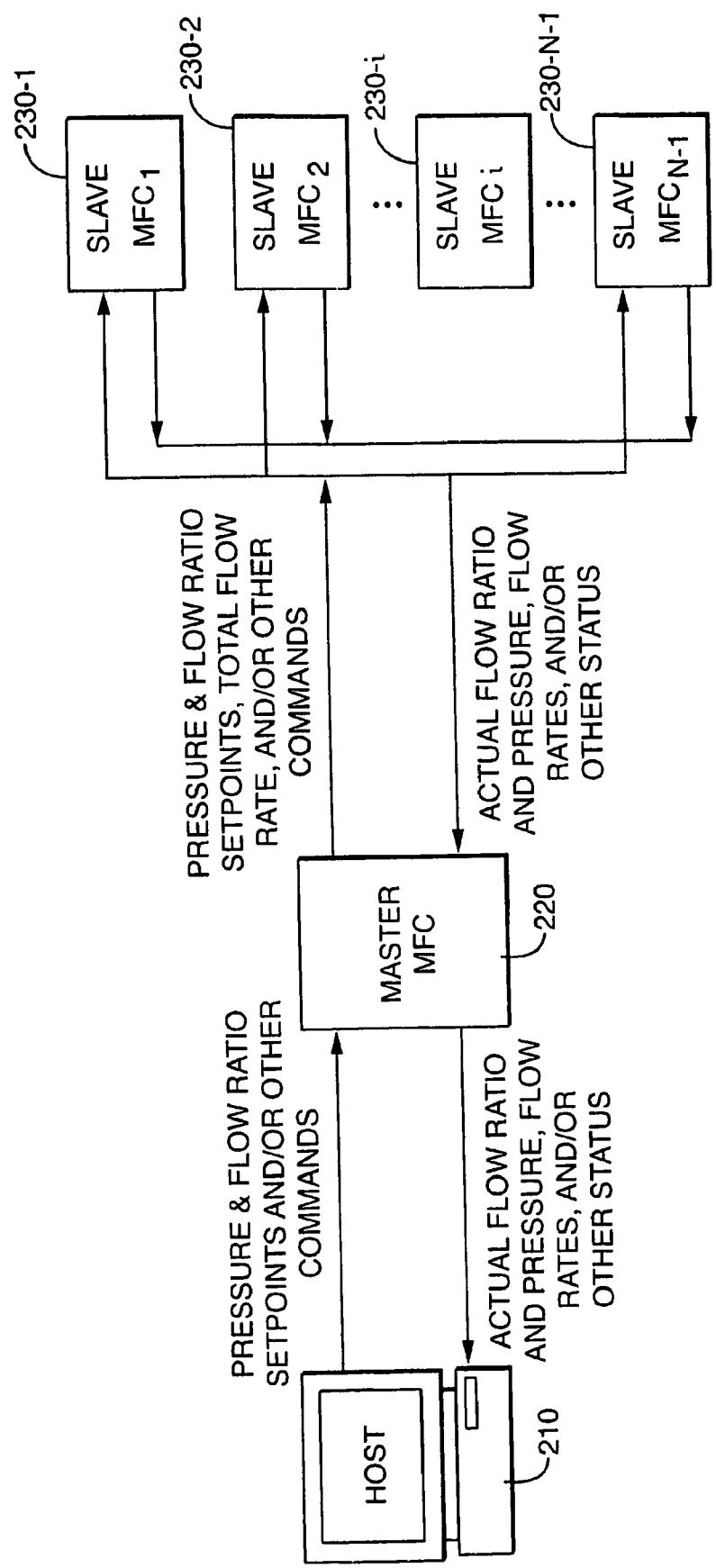
FIG. 2 illustrates communications between a host controller, a master MFC, and a plurality of slave MFCs, in one exemplary embodiment of the present disclosure.

FIG. 2 illustrates in more detail the communications between a host controller 210, a master MFC 220, and N−1 slave MFCs 230-1, 230-2, ..., 230-i, 230-N−1, in one embodiment of the present disclosure. As described above, the master MFC 220 receives multiple flow ratio set points and a pressure set point from the host controller 210, and communicates the multiple flow ratio set points and the pressure set point to the slave MFCs 230-i (i=1, ..., N−1). The master MFC 220 also computes the total flow rate $Q_T$ by summing the flow rates $Q_i$ (i=1, ..., N) of all the fluids $F_i$ that flow through the individual mass flow controllers, and communicates the total flow rate $Q_T$ to the slave MFCs 230-i. This total flow multiplied by the individual flow ratio percentage is the flow set point to the individual MFCs, and is sent out by the master MFC 220 via the digital communication network described in conjunction with FIG. 1.

As explained earlier, one of the MFCs (either the master MFC 220, or one of the slave MFCs 230-i) is selected as a pressure control MFC, which uses the pressure set point from the host controller (instead of the flow set point) to regulate its flow to control the chamber pressure. Its flow ratio is achieved and maintained by the other flow control MFCs. For example, if the pressure control MFC decreases its flow to the chamber in order to bring the chamber pressure down, other flow control MFCs decrease their flows to the chamber in order to maintain the targeted flow ratio. The net result is that the total flow to the chamber is decreased, and the chamber pressure is decreased.

Each slave MFC 230-i measures the actual flow rate of the fluid that flows through the slave MFC, and communicates the measured actual flow rate back to the master MFC 220. Each slave MFC 230-i may also compute the actual flow ratio of the fluid that flows through the slave MFC 230-i, where the actual flow ratio is the ratio between the actual flow rate measured by the slave MFC 230-i and the total flow rate $Q_T$ received by the slave MFC 230-i from the master MFC 220.

Each slave MFC 230-i reports back to the master MFC 220 the actual flow rate and flow ratio. The master MFC 220, in turn, reports to the host controller 210 the actual flow rates and the actual flow ratios received from each slave MFC 230-i. The host controller 210 may adjust the flow ratio set points, in accordance with the processing receipt, and the master MFC 220 may receive these adjusted flow ratio set points. The host controller 210 may also query the status of the master MFC 220 and/or the slave MFCs 230-i and the actual flow ratio in each flow channel i.

In addition, the master MFC 220 may receive one or more further signals from the host controller 210, and communicate these signals to the slave MFCs 230-i. These further signals may include, but are not limited to: a signal that requests for the value of the valve current in one or more of the mass flow controllers; a signal that requests diagnostics information from one or more of the mass flow controllers; and a signal that requests for the value of the temperature in the flow body of one or more of the mass flow controllers. The slave MFCs may make the necessary measurements relating to the valve current and/or diagnostics information and/or temperature, and communicate the measured actual values requested by the host controller 210 to the master MFC 220. The master MFC 220, in turn, reports back to the host controller 210 the requested values of the valve current, temperature, and diagnostics information.

Figure 3:
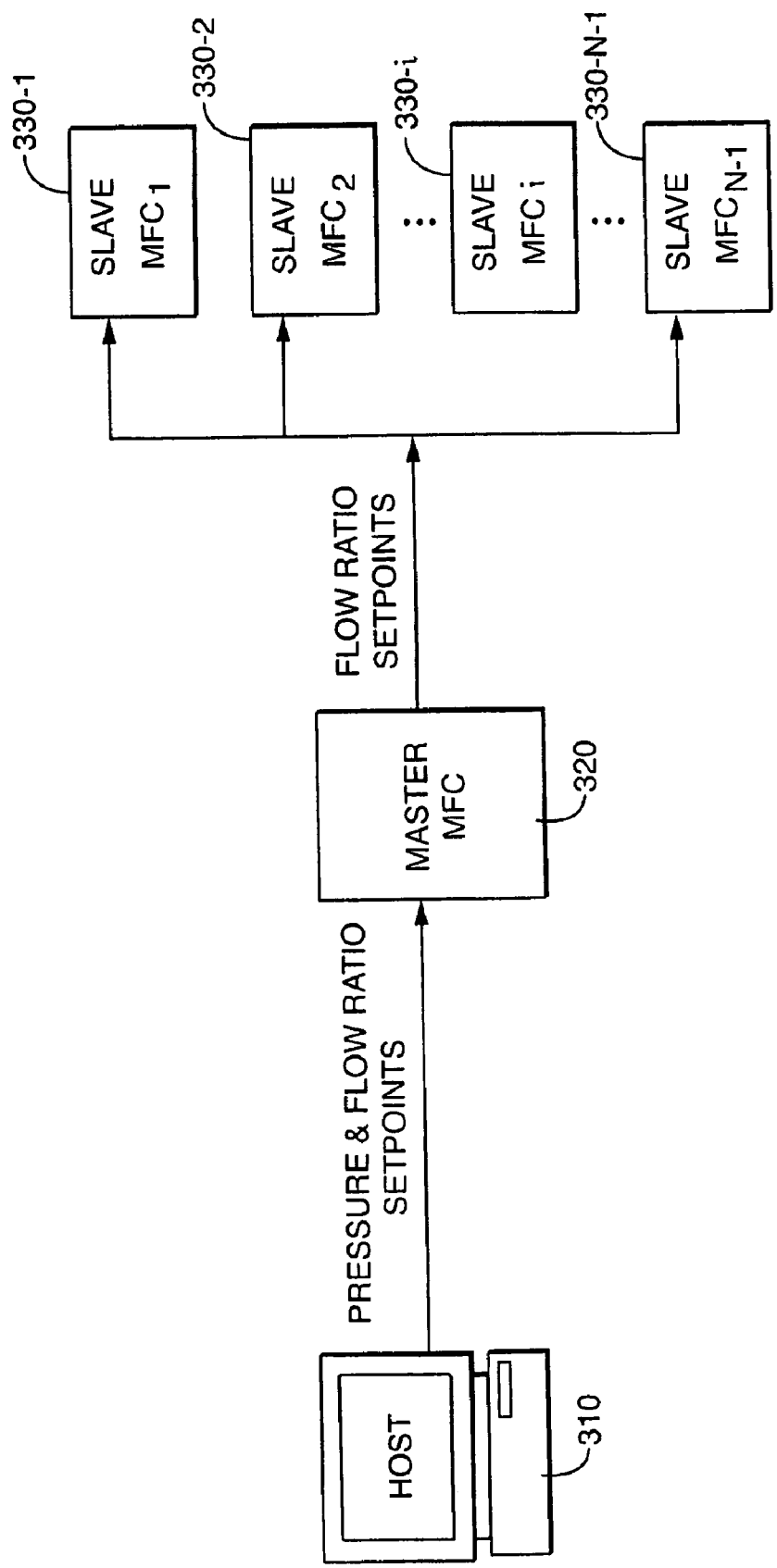
FIG. 3 illustrates communications between a host controller, a master MFC, and a plurality of slave MFCs, in another exemplary embodiment of the present disclosure.

In a simpler embodiment illustrated in FIG. 3, a plurality N of mass flow controllers $MFC_i$ (i=1, ..., N) may include one master MFC 320 configured as the pressure control MFC and N−1 slave MFCs 330-1, 330-2, ..., 330-i, ..., 330-N−1. These MFCs may all be configured as flow control MFCs, as described above, but in this embodiment, the master MFC 320 does not receive feedback from the slave MFCs 330-i (i=1, ..., N−1) regarding actual flow rates and flow ratios in the individual slave MFCs. Rather, in the simple feed-forward configuration illustrated in FIG. 3, the master MFC 320 just receives the pressure set point and the N flow ratio set points from a host controller 310, then determines the flow set points for the N−1 slave flow control MFCs 330-i (i=1, . . . , N−1) according to the following equation:

$$Q_{sp,i} = \frac{r_{sp,i}}{r_{sp,master}} \cdot Q_{m,master}. \quad (1)$$

In the above equation, $Q_{sp,i}$ is the flow set point for the i-th flow control MFC, $r_{sp,i}$ is the flow ratio set point for the i-th flow control MFC, $r_{sp,master}$ is the flow ratio set point for the master MFC 320, and $Q_{m,master}$ is the measured flow rate of the master MFC 320. The master MFC 320 then communicates the flow set points determined by Eq.(1) to all the slave MFCs 330-i (i=1, . . . , N−1). In response, the slave MFCs control the flow rates of the respective fluids Qi so as to maintain the flow rate at the flow set points received from the master MFC 320. The master MFC 320 regulates its flow to control the chamber pressure so as to maintain the chamber pressure at the pressure set point received from the controller.

In sum, the present disclosure describes multiple MFCs that are linked together via a digital communication network to form an N-channel integrated pressure and flow ratio control system, which is very flexible and cost effective. The system implements a distributed control algorithm which can control both the chamber pressure and the flow ratios for multiple fluid flow channels. In this system, one of the MFCs is selected as the master MFC to communicate with the host controller to receive the chamber pressure set point, the flow ratio set points, and other command signals. The master MFC also collects the actual flow rates from the slave MFCs via a digital communication network, and sends the corresponding flow/pressure set point (received from the host controller) to the slave MFCs. The chamber pressure signal is routed to a pressure control MFC, which is selected to control the chamber pressure, and which may be the master MFC.

The system and method described in the present disclosure allow for the concentration of a plurality of reactive fluid/gas lines to be controlled, while keeping the chamber pressure constant. This has been a challenge for gas delivery technology in semiconductor processing. The approach described in the above disclosure enables a high accuracy control of fluid/gas mix ratios across a wide range of fluid/gas lines, while at the same time allowing the chamber pressure to be kept constant via real-time measurement.

While certain embodiments have been described of an integrated pressure and flow ratio control system and method, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A pressure and flow ratio control system comprising:
    a plurality N of mass flow controllers $MFC_i$(i=1, . . . , N) each configured to receive at an inlet an i-th one of a plurality N of fluids $F_i$(i=1, . . . , N) and to control flow rate of the i-th fluid $F_i$ from the inlet through an outlet of the $MFC_i$ and directly into a processing chamber, without an intermediate manifold, the N mass flow controllers $MFC_i$(i=1, . . . , N) including one master MFC and a plurality (N−1) of slave MFCs;
    wherein the master MFC is configured to receive flow ratio set points from a host controller, and to communicate the flow ratio set points to all the slave MFCs together with one or more command signals, so as to maintain ratios $Qi/Q_T$(i=1, . . . , N) at the flow ratio set points, where $Q_i$ represents flow rate of the i-th fluid $F_i$, and $Q_T$ represents a sum $Q_T = Q_1 + \ldots + Q_i + \ldots Q_N$ of flow rates of all N individual fluids $F_i$(i=1, . . . , N); and
    wherein one of the mass flow controllers $MFC_i$(i=1, . . . , N) is a pressure control MFC configured to receive a pressure set point from the host controller and to maintain pressure in the chamber at the pressure set point by regulating flow to the processing chamber, and remaining ones of the mass flow controllers $MFC_i$(i=1, . . . , N) are (N−1) flow control MFCs configured to control the flow rates $Q_i$ so as to maintain the flow ratios $Q_i/Q_T$ at the flow ratio set points.

2. The system of claim 1, wherein the pressure control MFC is the master MFC, and the (N−1) flow control MFCs are the (N−1) slave MFCs.

3. The system of claim 1, further comprising a pressure transducer configured to measure actual pressure within the chamber, and wherein the pressure control MFC includes a pressure input and is configured to receive from the pressure transducer at the pressure input a pressure signal representing the measured pressure, and to regulate its flow to the processing chamber so as to control the chamber pressure in response to the pressure signal until the pressure in the chamber reaches the pressure set point.

4. The system of claim 1, wherein the (N−1) flow control MFCs are responsive to the flow ratio set points from the host controller to control flow rate of the respective fluids $F_i$ so that the actual flow ratios $Q_i/Q_{T(i=1}, \ldots, N-1)$ satisfy the flow ratio set points.

5. The system of claim 1, wherein each one of the (N−1) slave MFCs is configured to measure an actual flow rate of a corresponding one of the fluids $F_i$, and to communicate the actual flow rate to the master MFC.

6. The system of claim 5, wherein the master MFC is further configured to communicate the total flow rate $Q_T$ to all the slave MFCs.

7. The system of claim 6,
    wherein each slave MFC is further configured to compute an actual flow ratio and to report the actual flow ratio to the master MFC; and
    wherein the actual flow ratio is a ratio between the actual flow rate and the total flow rate $Q_T$ received from the master MFC.

8. The system of claim 6, wherein the master MFC is configured to report back to the host controller the actual flow rates and the actual flow ratios received from each slave MFC.

9. The system of claim 8, wherein the master MFC is further configured to report back to the host controller at least one of: the actual chamber pressure; and status information for the system.

10. The system of claim 1, wherein the master MFC is configured to compute the total flow rate $Q_T$ by summing the flow rates $Q_i$ (i=1, ..., N) of the individual fluids $F_i$.

11. The system of claim 1, further comprising a digital communication bus, and wherein the master MFC and the slave MFCs are linked through the digital communication bus and are configured to communicate with each other through the digital communication bus.

12. The system of claim 11, wherein the digital communication bus is connected to a network that comprises at least one of: Ethernet TCP/IP; DeviceNet; CAN (Controller Area Network); UDP/IP (User Datagram Protocol/Internet Protocol); DeviceNet; CAN (Controller Area Network); RS (Recommended Standard)-232; and RS (Recommended Standard)-485.

13. The system of claim 1, wherein each mass flow controller $MFC_i$ (i=1, ..., N) includes:
a flow body $B_i$(i=1, ..., N) configured to receive the fluid $F_i$ at an inlet and providing a flow path for the fluid $F_i$ between the inlet and an outlet of the flow body $B_i$;
a flow sensor $S_i$ (i=1, ..., N) configured to measure flow rate of the fluid $F_i$ as the fluid $F_i$ flows from an inlet to an outlet of the $MFC_i$; and
a control valve $V_i$(i=1, ..., N) configured to regulate flow of the fluid $F_i$ at a desired flow rate.

14. The system of claim 13,
wherein the master MFC is further configured to receive one or more further signals from the host controller, the signals comprising at least one of:
a signal requesting for value of valve current in one or more of the valves $V_i$(i=1, ..., N) in the mass flow controllers;
a signal requesting diagnostics information from one or more of the plurality of mass flow controllers $MFC_i$(i=1, ..., N); and
a signal requesting for value of temperature of one or more of the flow bodies $B_i$(i=1, ..., N).

15. The system of claim 1, wherein at least one of the fluids $F_i$(i=1, ..., N) is a gas.

16. The system of claim 1, wherein the number N of the mass flow controllers $MFC_i$(i=1, ..., N) is variable.

17. A pressure and flow ratio control system comprising:
a plurality N of mass flow controllers $MFC_i$(i=1, ..., N) each configured to receive at an inlet an i-th one of a plurality N of fluids $F_i$(i=1, ..., N) and to control flow rate of the i-th fluid $F_i$ from the inlet through an outlet of the $MFC_i$ and directly into a processing chamber configured to process the fluids $F_i$(i=1, ..., N), without an intermediate manifold, the mass flow controllers including one master MFC and N-1 slave MFCs;
wherein the master MFC is configured to receive from a host controller a pressure set point and a plurality N of flow ratio set points, the master MFC further configured to determine flow ratio set points for each of the N-1 slave MFCs and to communicate said flow ratio set points to the N-1 slave MFCs; and
wherein the N-1 slave MFCs are configured to control the flow rates of the respective fluids $Q_i$ so as to maintain ratios $Q_i/Q_T$(i=1, ..., N) at the flow ratio set points received from the master MFC, where $Q_i$ represents flow rate of the i-th fluid $F_i$, and $Q_T$ represents a sum $Q_T=Q_1+...+Q_i+...Q_N$ of flow rates of all N individual fluids $F_i$(i=1, ..., N).

18. The system of claim 17, wherein the master MFC is configured to determine the flow set points for each of the N-1 slave MFCs by using a mathematical formula that comprises:

$$Q_{sp,i} = \frac{r_{sp,i}}{r_{sp,master}} \cdot Q_{m,master},$$

where $QHD_{sp,i}$ represents a flow set point for the i-th flow control MFC;
$r_{sp,i}$ represents the flow ratio set point for the i-th flow control MFC;
$r_{sp,master}$ represents the flow ratio set point for the master MFC; and
$Q_{sp,master}$ represents a measured flow rate of the master MFC.

19. The system of claim 17, wherein the master MFC is further configured to regulate flow of a respective one of the fluid Fi through the master MFC to control pressure in the processing chamber so as to maintain the pressure in the processing chamber at the pressure set point received from the host controller.

20. A gas processing system comprising:
a chamber configured to process a plurality of fluids $F_i$(i=1, ..., N); and
a plurality N of mass flow controllers $MFC_i$ (i=1, ..., N) each configured to receive at an inlet an i-th one of the plurality of fluids $F_i$ (i=1, ..., N) and to control flow rate of the i-th fluid $F_i$ from the inlet through an outlet of the $MFC_i$ and directly into the chamber, without an intermediate manifold, the N mass flow controllers $MFC_i$ (i=1, ..., N) including one master MFC and a plurality (N-1) of slave MFCs;
wherein the master MFC is configured to receive flow ratio set points from a host controller, and to communicate the flow ratio set points to all the slave MFCs together with one or more command signals, so as to control ratios $Q_i/Q_{T(i}=1, ..., N)$ at the flow ratio set points, where $Q_i$ represents flow rate of the i-th fluid $F_i$, and $Q_T$ represents a sum $Q_T=Q_1+...+Q_{i+...}Q_N$ of flow rates of all N individual fluids $F_i$(i=1, ..., N); and
wherein one of the mass flow controllers $MFC_i$(i=1, ..., N) is a pressure control MFC configured to receive a pressure set point from the host controller and to control pressure in the chamber at the pressure set point.

21. A method of controlling pressure of a processing chamber and flow ratios of a plurality N of fluids $F_i$ (i=1, ..., N) to the processing chamber, the method comprising:
directly connecting a plurality N of mass flow controllers $MFC_i$ (i=1, ..., N) between one or more sources of a plurality N of fluids $F_i$ (i=1, ..., N) and a processing chamber that processes the N fluids $F_i$, without an intermediate manifold, wherein the plurality N of mass flow controllers $MFC_i$(i=1, ..., N) include one master MFC and a plurality (N-1) of slave MFCs;
the master MFC and the slave MFCs maintaining ratios $Q_i/Q_T$(i=1, ..., N) at flow ratio set points received from a host controller, wherein $Q_i$ represents flow rate of i-th fluid $F_i$ as measured by i-th mass flow controller $MFC_i$ during flow of $F_i$ from the source through the $MFC_i$ into the processing chamber, and wherein $Q_T$ represents a sum $Q_T=Q_1+...+Q_i+...Q_N$ of flow rates of all N fluids $F_i$; and
one of the mass flow controllers $MFC_i$ (i=1, ..., N) maintaining pressure in the processing chamber at a pressure set point received from the host controller.

22. The method of claim 21, wherein the act of maintaining ratios $Q_i/Q_T$(i1, ..., N) at the flow ratio set points comprises:

the master MFC receiving the flow ratio set points from the host controller and maintaining flow rate of fluid through the master MFC at a respective flow ratio set point; and the master MFC transmitting the flow ratio set points together with one or more command signals to the slave MFCs, causing the slave MFCs to maintain flow rate of fluid through the slave MFCs at respective flow ratio set points.

* * * * *